United States Patent [19]

Arons

[11] Patent Number: 4,541,973
[45] Date of Patent: Sep. 17, 1985

[54] PRODUCTION OF FERRIMAGNETIC SPINEL FIBERS

[75] Inventor: Richard M. Arons, Chatham, N.J.

[73] Assignee: Celanese Corporation, New York, N.Y.

[21] Appl. No.: 487,321

[22] Filed: Apr. 21, 1983

[51] Int. Cl.$^4$ ................................................ C04B 35/71
[52] U.S. Cl. ...................................... 264/60; 264/61; 264/63; 264/66; 264/176 F
[58] Field of Search ................ 264/61, 63, 66, 176 F, 264/DIG. 19, 60

[56] References Cited

U.S. PATENT DOCUMENTS

| | | | |
|---|---|---|---|
| 2,968,622 | 1/1961 | Whitehurst | 264/61 |
| 3,107,152 | 10/1963 | Ford et al. | 423/447.8 |
| 3,116,975 | 1/1964 | Cross et al. | 423/447.8 |
| 3,179,605 | 4/1965 | Ohsol | 423/447.8 |
| 3,270,109 | 8/1966 | Kelsey | 264/178 |
| 3,271,173 | 9/1966 | Lockhart et al. | 106/65 |
| 3,285,696 | 11/1966 | Tsunoda | 423/447.6 |
| 3,311,689 | 3/1967 | Kelsey | 264/83 |
| 3,385,915 | 5/1968 | Hamling | 264/42 |
| 3,529,044 | 9/1970 | Santangelo | 264/29 |
| 3,760,049 | 9/1973 | Borer et al. | 264/57 |
| 3,846,527 | 11/1974 | Winter | 264/63 |
| 4,008,299 | 2/1977 | Birchall et al. | 264/63 |
| 4,071,594 | 1/1978 | Pearson | 264/63 |
| 4,126,652 | 11/1978 | Oohara et al. | 264/29.6 |
| 4,268,278 | 5/1981 | Dobo | 264/63 |

*Primary Examiner*—Jeffery Thurlow
*Assistant Examiner*—Patrick Dailey
*Attorney, Agent, or Firm*—Depaoli & O'Brien

[57] ABSTRACT

This invention provides a spinning process for the preparation of ferrimagnetic spinel fibers composed of crystallites corresponding to the formula:

$$M_1Fe_2O_4$$

where M is manganese, iron, cobalt, nickel, copper, zinc, cadmium, magnesium, barium, strontium, or any combination thereof.

7 Claims, No Drawings

PRODUCTION OF FERRIMAGNETIC SPINEL FIBERS

BACKGROUND OF THE INVENTION

Inorganic fibers have received increasing attention because of new industrial demands for fibers capable of withstanding elevated temperatures without deleterious effects. The growing aerospace industry provides many applications for light and strong heat resistant fibrous materials. Inorganic refractory fibers commonly available today in commercial quantities include graphite, alumina-silica, boron nitride and silicon carbide.

The formation of inorganic refractory fibers has required elaborate and time consuming procedures since such compounds possess high melting points which render melt spinning either impossible or extremely difficult. Procedures for the thermal formation of fibrous graphite have been proposed in which continuous cellulosic fibers or woven textile articles formed therefrom serve as the starting material. Also, generally infusible synthetic polymeric fibers, such as those formed from acrylonitrile or copolymers thereof, have served as starting materials in processes proposed for the production of fibrous graphite.

U.S. Pat. Nos. 3,270,109 and 3,271,173 disclose processes for the production of inorganic oxide monofilaments in which a precursor fiber composed of certain organometallic salts is formed and then heated to convert the same to the desired inorganic filament. Additionally, inorganic fibers such as those formed from boron or boron carbide have been prepared by the vapor deposition of the same upon a substrate, such as fine tungsten wire.

Other United States patents which specifically relate to production of inorganic fibers include U.S. Pat. Nos. 3,107,152; 3,116,975; 3,179,605; 3,270,109; 3,271,173; 3,285,696; 3,311,689; 3,385,915; 3,529,044; 3,760,049; 4,008,299; and 4,126,652.

Inorganic fibers also are finding new applications in the growing electronics industry. There is interest in ceramic fibers which exhibit magnetic anisotropy and high electrical resistivity.

U.S. Pat. No. 2,968,622 describes a process for the preparation of magnetic ceramic fibers which involves attenuation of a molten magnetic material into a fine filament having a mechanically oriented atomic distribution, and followed by rapid chilling thereof to freeze the oriented atomic distribution.

Magnetic ceramic fibers have a wide range of adaptability for prospective applications such as the production of transformers, inductors, switching elements, memory devices, recording heads, tapes, electromagnetic interaction shields, and the like.

There remains a need for new and improved processes for the production of inorganic fibers. There is further need for novel magnetic ceramic fibers which can meet specifications for applications such as electromagnetic interaction shielding.

Accordingly, it is an object of this invention to provide an improved process for the production of inorganic fibers.

It is another object of this invention to provide a process for the production of ferrimagnetic spinel fibers.

It is a further object of this invention to provide novel ferrimagnetic spinel fibers.

Other objects and advantages of the present invention shall become apparent from the accompanying description and example.

DESCRIPTION OF THE INVENTION

One or more objects of the present invention are accomplished by the provision of a process for the production of ferrimagnetic spinel fibers which comprises (1) forming a spinning composition comprising a fluid organic polymer medium having dispersed therein particulate ferrite with an average particle size less than about 1000 angstroms, wherein the ferrite is a spinel corresponding to the formula:

$$M_1Fe_2O_4$$

where M is manganese, iron, cobalt, nickel, copper, zinc, cadmium, magnesium, barium, strontium, or any combination thereof; (2) spinning the composition into a coagulating medium to form solid fibers; and (3) pyrolyzing the fibers at a temperature between about 800°–2500° C. in the presence of molecular oxygen to form ferrimagnetic $M_1Fe_2O_4$ spinel fibers.

The term "spinning" refers to attenuation of a viscous fluid composition into fibers by mechanical means, such as by extrusion through a spinneret.

The term "particle size" refers to the average diameter of a ferrite particle.

The term "coagulating medium" refers to either wet or dry means of solidifying a fiber formed by mechanical attenuation of a spinnable composition.

Superior ferrimagnetic properties are achieved when the $M_1Fe_2O_4$ spinel fibers are a nickel-zinc ferrite composition. Exceptional ferrimagnetic properties are exhibited by a nickel-zinc ferrite spinel in which the gram-atom ratio of nickel/zinc/iron is about 0.7:0.3:2. The ferrimagnetic spinel fibers are suitable for production of textile fabrics which are excellent for electromagnetic interaction shielding applications.

An essential aspect of the invention process is the utilization of particulate ferrite with an average particle size less than about 1000 angstroms, as the dispersion phase of the step(1) spinning composition. The strength and flexibility of the step(3) spinel fiber product tend to improve as the average particle size of the fine ferrite powder in the step(1) spinning composition is decreased.

The ultimate mechanical properties of the spinel fibers are also directly affected by the content of the ferrite dispersion in the step(1) spinning solution. It is advantageous to provide the highest possible weight content of ferrite powder in the spinning composition, while maintaining the desirable spinning properties of the composition. The ferrite content usually will be in the range between about 20–80 weight percent, and preferably in the range between about 40–80 weight percent.

The fluid polymer medium of the step(1) spinning composition can comprise any natural or synthetic organic polymer which supports the ferrite powder in the dispersed state, and which provides a proper viscosity under the spinning conditions of step(2), and which does not melt under the step(3) pyrolysis conditions.

Illustrative of suitable polymers are polyisobutylene, polyisoprene, polystyrene, polymethyl methacrylate, polyvinyl alcohol, polyacrylamide, polyacrylic acid, polyethylene oxide, cellulose, carboxymethyl cellulose, hydrolyzed starch, dextran, guar gum, polyvinylpyrrolidone, polyurethane, polyvinyl acetate, and the like, and mixtures thereof.

The preferred molecular weight for the polymer medium species will vary depending on the particular polymer type selected, the presence or absence of a solvent diluent, and the viscosity range desired for the spinning composition. The molecular weight of the polymers will vary over the range between about $10^3$–$10^6$.

In most cases a solvent diluent is employed to provide a spinning composition (i.e., a spinning dope) with a room temperature viscosity range between about 0.1–3000 poises, and preferably between about 100–1000 poises.

The solvent employed with a water-miscible polymer can be water and/or a water-miscible solvent such as methanol, ethanol, acetic acid, dimethylformamide, tetrahydrofuran, and the like, The solvent employed with an oil-soluble polymer can be an organic solvent such as benzene, hexane, dichloroethylene, dimethylacetamide, dibutyl ether, ethyl acetate, and the like.

Spinning can be accomplished with either wet or dry spinning techniques. As described in U.S. Pat. No. 3,846,527, dry spinning can be conducted in a centrifugal spinning machine. In this case, the filaments are thrown from the periphery of a rotating spinning vessel, after which they pass through a drying zone and are then taken up. This method is suitable for the production of staple fibers which are then heat treated either continuously or in batches. It is preferred to apply a conventional dry spinning process in which the solutions are spun at a temperature between about 15°–60° C. from a spinning head provided with several orifices. The filaments issuing from the spinning head pass through a spinning column which can be heated to a temperature of up to several hundred degrees and in which they are drawn to a diameter of from about 50 to 1 microns and can then be wound up. A stream of drying gas is simultaneously fed through the spinning column. The temperature of the spinning column and that of the drying gas is dependent on the volatiles which have to be evaporated from the filament during its passage through the spinning column.

As described in U.S. Pat. No. 3,529,044, in a wet spinning procedure a spinning dope can be extruded into a spin bath at a temperature between about 25°–60° C. where coagulation of the solution and the formation of a fiber occurs. A variety of suitable solvent-nonsolvent systems are known in the fiber art for use as the coagulating medium or spin bath. Suitable spin baths are nonsolvents for the organic polymer and do not chemically react with the spinning solution.

One type of useful spin bath consists of an aqueous mineral acid solution, such as a mixture of about 20–50 weight percent sulfuric acid and about 5–10 weight percent phosphoric acid. Other suitable spin bath media include organic solvents such as acetone; inorganic salt solutions such as aqueous sodium carbonate; and the like.

It has been found that the spinning procedure is facilitated and the mechanical properties of the formed fiber product are enhanced when a surfactant is included in the spinning dope as an extrusion aid. Fatty acid compounds are particularly suited for this purpose, e.g., oleic acid, ammonium oleate, and the like. The extrusion aid is employed in a quantity between about 0.05–5 weight percent, based on the weight of the spinning dope.

After a newly formed precursor fiber is withdrawn from a spin bath, usually it is stretched or drawn to about 100–300 percent of its original length by conventional techniques. Wet drawing is particularly preferred. Following the stretching step of the process the fiber can be washed to remove any adhering traces of the spin bath, and then dried.

The precursor fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively, various fibrous configurations may be formed from the inorganic fibers at the conclusion of the pyrolysis step of the process.

To provide a final spinel fiber product with optimal physical and magnetic properties, it is preferred to subject the intermediate precursor fiber from the precursor fiber formation step to an initial thermal treatment in a molecular oxygen environment. The organic polymer substrate in the presursor fiber is partially carbonized to a stabilized form so that the subsequent pyrolysis step of the process can be effected without the concomitant destruction of the fibrous configuration. The thermal treatment step can be conducted by heating the precursor fiber in a molecular oxygen-containing atmosphere at a temperature ranging between about 200°–600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymer. Typically a 15–50 percent reduction in the weight of the precursor fiber occurs during the thermal treatment step. It is believed that a crosslinking of carbon atoms occurs during the thermal treatment to produce a charred structure which is capable of serving as a carrier for the inorganic content of the fiber.

The thermal treatment can be performed in an autoclave by heating to the required temperature/time schedule. A continuous thermal treatment can be accomplished by the continuous passage of a precursor fiber through a heated chamber or calcining furnace. The fibrous structure of the precursor fiber is retained throughout the thermal treatment step. There is a tendency for the precursor fiber to shrink while undergoing thermal treatment.

Alternatively, the precursor fibers can be subjected to a chemical stabilization treatment before being subjected to the pyrolysis step. In a typical stabilization procedure, the dried fibers are contacted with a reactive free radical-forming agent such as diaziodoformamide, which effects the desired crosslinked structure in the fiber substrate at ambient temperatures (e.g., 10°–40° C.).

In the subsequent pyrolysis step of the process, the precursor fiber (either charred or uncharred) is subjected to a temperature between about 800°–2500° C., preferably between about 1000°–2000° C., in an oxidizing atmosphere for a period of time sufficient to yield a ferrimagnetic $M_1Fe_2O_4$ spinel fiber substantially free of carbon content. The pyrolysis period normally will range between about 0.2–2 hours.

A weight loss of approximately 40–75 percent based on the weight of the original precursor fiber is commonly encountered during the pyrolysis step. While undergoing such heating, the charred product assumes a white-hot state which ultimately yields a spinel fiber, and the fibrous configuration of the original precursor fiber is maintained.

The following Examples are further illustrative of the present invention. The specific ingredients and processing parameters are presented as being typical, and various modifications can be derived in view of the foregoing disclosure within the scope of the invention.

EXAMPLE I

This Example illustrates the synthesis of a ferrimagnetic nickel-zinc ferrite having the composition $Ni_{0.7}Zn_{0.3}Fe_3O_4$.

A 630.2 gram quantity of Fe(acetylacetonate)$_3$ (1.78 moles), and 182.9 grams of Ni(acetylacetonate)$_2$.2H$_2$O (0.62 mole), and 80.2 grams of Zn(acetylacetonate)$_2$.2-H$_2$O (0.27 mole) are dissolved in 3 liters of tetrahydrofuran contained in a round-bottom flask equipped with a condenser, stirrer, and dropping funnel.

The metal acetylacetonate solution is refluxed for one hour with stirring, and then the solution is cooled to room temperature. A 500 milliliter quantity of concentrated aqueous ammonia (28–30%) is added dropwise to the metal acetylacetonate solution over a period of 0.7–1 hour. The rate of addition is controlled to prevent a boil-over during the exothermic gelling reaction.

The gelled solution is refluxed for one hour, and then the solvent is stripped off to provide a solid phase spinel precursor. The spinel precursor is loaded into an alumina boat and pyrolyzed in a furnace at 500° C. under an inert atmosphere of nitrogen gas. When the evolution of volatile material has ceased (about 15–20 minutes), the resultant char is ground to a fine powder with a mortar and pestle or a ball mill. The fine powder is reloaded into an alumina boat, and the material is pyrolyzed for 15–20 minutes at 600° C. in an environment of molecular oxygen. The resultant brown powder is a ferrimagnetic spinel.

The average particle size as determined by Scanning Electron Microscope measurements is less than about 1000 angstroms. About 110 grams of ferrimagnetic spinel product is obtained, which corresponds to a yield of 50–55 weight percent.

EXAMPLE II

This Example illustrates the production of ferrimagnetic spinel fibers in accordance with the present invention.

A dispersion is prepared with the following ingredients:

112 g $Ni_{0.7}Zn_{0.3}Fe_3O_4$
460 g Water
140 g Polyvinyl alcohol (Dupont Elvanol ® 75-15)
1 ml oleic acid The dispersion is heated until there is a homogeneous solution containing a suspension of the ferrite powder (average particle size of less than 1000 Å), which has a viscosity of 11,760 poises.

This spinning dope formulation is spun through a 400–600 μm spinneret, and coagulated in a saturated aqueous solution of ammonium sulfate. The filaments are air-dried with draw ratios ranging between 1:1 and 4:1.

The dried fibers are stabilized by chemical treatment with a free radical-forming crosslinking reagent, e.g., by contacting the fibers with diazidoformamide (Hercules S-3060) at room temperature.

The stabilized fibers are slowly heated to prevent blistering by outgassing decomposition products. The fibers are heated at 1400° C. for about 4 hours, and then cooled to room temperature.

What is claimed is:

1. A process for the production of ferrimagnetic spinel fibers which comprises (1) forming a spinning composition comprising a fluid organic polymer medium having dispersed therein particulate ferrite with an average particle size less than about 1000 angstroms, wherein the ferrite is a spinel corresponding to the formula:

$$M_1Fe_2O_4$$

where M is manganese, iron, cobalt, nickel, copper, zinc, cadmium, magnesium, barium, strontium, or any combination thereof; (2) spinning the composition into a coagulating medium to form solid fibers; and (3) stabilizing the fibers by chemical treatment with a reactive free radical-forming crosslinking agent and pyrolyzing the fibers at a temperature between about 800°–2500° C. in the presence of molecular oxygen to form ferrimagnetic $M_1Fe_2O_4$ spinel fibers.

2. A process in accordance with claim 1 wherein the spinning composition in step(1) contains between about 20–80 weight percent of particulate ferrite, based on composition weight.

3. A process in accordance with claim 1 wherein the spinning composition in step(1) contains a surfactant extrusion aid.

4. A process in accordance with claim 1 wherein the formation of solid fibers in step(2) is by dry-spinning means.

5. A process in accordance with claim 1 wherein the formation of solid fibers in step(2) is by wet-spinning means.

6. A process in accordance with claim 1 wherein M in the step(3) $M_1Fe_2O_4$ spinel fibers is nickel, zinc or a combination thereof.

7. A process in accordance with claim 5 wherein the gram-atom ratio of nickel/zinc/iron is about 0.7:0.3:2.

* * * * *